April 9, 1957 S. LANDELL 2,788,100
MOLDING RETAINER
Filed Dec. 6, 1950

Inventor
Stanford Landell
By Willits, Helwig & Baillio
Attorneys

United States Patent Office 2,788,100
Patented Apr. 9, 1957

2,788,100

MOLDING RETAINER

Stanford Landell, Lansing, Mich., assignor to General Motors Corporation, Detroit, Mich., a corporation of Delaware Application December 6, 1950, Serial No. 199,540

5 Claims. (Cl. 189—88)

This invention relates to a molding retainer and particularly to an improved means for securing finished objects to supporting surfaces, such as the securing of a molding to a body panel of an automobile.

A principal object of the invention is to provide an inexpensive molding retaining means to rigidly secure a molding or trim strip to a supporting panel without causing any distortion thereof. The individual clips or bolted retainers heretofore most frequently used in securing moldings often caused the supporting sheet metal panels to become dimpled or distored when the nuts were tightened on the bolts. The present invention not only eliminates this difficulty but also provides a retainer which is less expensive than individual attaching bolts or clips.

A further object of the invention is to provide a molding mounting means which is particularly adapted for use with tapered hollow moldings and hollow moldings possessing longitudinal curvature. Furthermore, the invention provides a molding assembly comprising a molding and an anchoring means or retaining device which permits the ready attachment of the molding to a supporting surface containing misaligned openings through which bolt portions of the retainer may be introduced.

These and other objects are attained in accordance with the invention by providing an elongated retainer strip or a series of such strips, preferably of sheet metal, which may be inserted into the molding to be mounted through an opening formed in inturned flanges of the molding. These strips are provided with longitudinally spaced arms or head portions which extend laterally to engage inturned flanges of the molding to serve as anchoring members for attaching means, each of the head portions preferably being apertured to receive a bolt. The strips are longitudinally slidable within the moldings prior to final assembly of the molding on a supporting panel to thereby aid in properly aligning the bolts with openings in the panel. Moreover, the aforementioned head portions may be constructed with generally transversely extending slots in which carriage bolts ride to provide lateral adjustability, as well as longitudinal adjustability, of the retaining means and molding relative to the bolts and supporting panel.

Other objects and advantages of the invention will more fully appear from the following description of the preferred embodiment of the invention shown in the accompanying drawing, in which.

Figure 1:
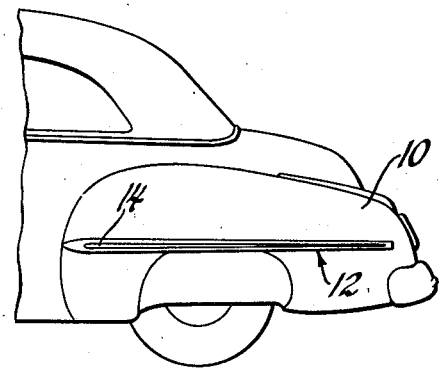
Figure 1 is a fragmentary longitudinal view of an automobile having a rear fender panel provided with a trim strip or molding assembly embodying the invention.
Figure 2:
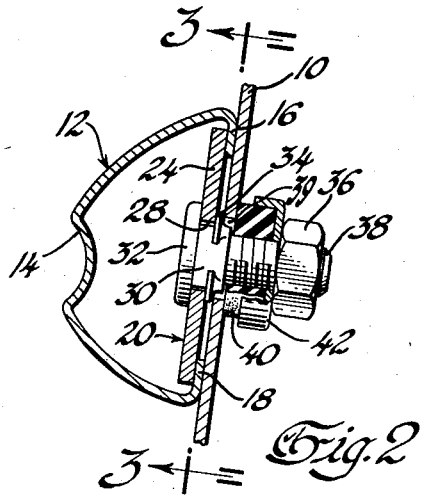
Figure 2 is an enlarged sectional view along the line 2—2 of Figure 3 of the molding assembly shown in Figure 1.

Referring more specifically to the drawing, in Figure 1 is shown an automobile having a fender panel 10 to which is attached a channel-shaped molding or trim strip, indicated generally by 12. As shown in Figure 2, the molding is provided with a longitudinally extending decorative groove or embossment 14 and the usual inturned flanges 16 and 18 which, when the molding is in assembled position, abut the apertured fender supporting panel 10. The molding is secured to this panel through the use of a pair of elongated anchor members or retainer strips, indicated generally by 20 and 22 in Figure 3, positioned within the hollow molding.

Figure 3:
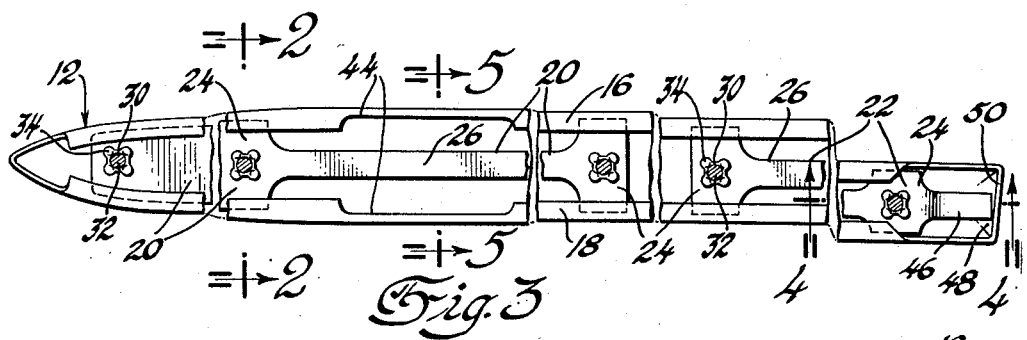
Figure 3 is a longitudinal view, with parts broken away and in section, of the molding assembly along the line 3—3 of Figure 2.

As can best be seen in Figure 3, each of these retainer strips is provided with a plurality of laterally extending arms or head portions 24 longitudinally spaced throughout the strip length and connected by relatively narrow portions 26. Although Figure 3 shows only a few head portions, it is preferable in most instances to form them every few inches along each strip.

The arms or head portions 24 engage the inner surfaces of the inturned flanges 16 and 18 to clamp the molding to the supporting panel 10. Each head portion is provided with a generally centrally located aperture 28 for receiving the neck portion 30 of a carriage bolt 32 or similar attaching means, lugs 34 on the bolt being staked against the retainer strip to lock the bolt thereto. The threaded portions 38 of the bolts 32 extend through openings 39 in the supporting panel and are engaged by nuts 36 to secure the molding and retaining strips to the supporting panel. Loosening of the nuts on the bolts is prevented by resilient washers 40 which are positioned between the nuts and the rear face of the panel and fitted with caps 42.

As shown in Figure 3, the inwardly extending flanges 16 and 18 are partially cut away near the widest portion of the molding to form a laterally enlarged opening or entrance portion 44 to permit insertion of the anchoring strips 20 and 22 into the molding. Inasmuch as both of these strips may be inserted through a single entrance portion in the rear face of the molding, this construction eliminates the need for unsightly openings in its ends or decorative face.

Moreover, the aforementioned arrangement precludes the necessity of using the large number of individual mounting clips ordinarily required in a comparatively long molding. This latter factor is of considerable importance and effects a great saving, particularly when the molding to be secured is tapered throughout its length, as is the one shown in the drawing, because it is otherwise frequently necessary to resort to the use of clips having a variety of sizes and configurations in order to secure a single such tapered molding. To provide for tapered moldings, laterally extending arms or head portions 24 of the anchoring strips 20 and 22 are preferably of progressively decreasing lateral extension from the entrance portion 44 to both ends of the molding, as shown in Figure 3. Prior to the attachment of the molding assembly to the supporting panel, the strips are longitudinally slidable within the molding to properly align the bolts with the openings 39 in the supporting panel, thus providing for longitudinal adjustment of the molding relative to the retainer.

The narrow connecting portions 26 of the anchoring strips, which are preferably constructed of sheet metal, are flexible in a direction normal to the molding. This flexibility of the slender connecting portions provides greater ease of insertion of the strips into the enlarged opening 44 by eleminiating any tendency to bind with the walls of the hollow molding. Moreover, constructing the anchoring strips so that they can be flexed makes them particularly adaptable to a variety of moldings having different degrees of longitudinal curvature and increases the longitudinal adjustability of the attached bolts relative to the bolt openings 39 in the supporting panel. This latter feature results from the fact that the narrow connecting portions 26 may be easily flexed nearer to or against the embossed portion 14 of the molding wall when any two bolts in the head portions of a retainer strip are forced toward one another.

Figure 4:
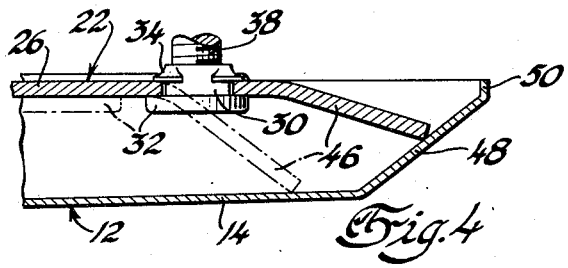
Figure 4 is an enlarged fragmentary sectional view along the line 4—4 of Figure 3, different positions of a retainer strip being shown with solid and broken lines.
Figure 5:
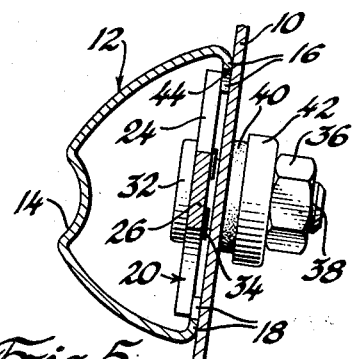
Figure 5 is an enlarged sectional view along the line 5—5 of Figure 3.

The retainer strip 22 is preferably provided at its rearward end with a longitudinally extending, resilient tab 46 which projects against the inner surface of the molding wall. In Figure 4 the position of the tab while it is being moved longitudinally within the molding is indicated by broken lines, the end of the tab frictionally engaging the inner surface of the embossed portion 14 of the molding wall. The solid lines show the tab in what is normally its position during attachment of the molding assembly to the supporting structure, with the tip of the tab being in contact with either the inclined end wall 48 of the molding or the smaller flange portion 50 at the adjacent end thereof. The inclined wall and the flange portion serve as partial and complete stops, respectively, to restrain further longitudinal sliding of the strip within the molding.

This frictional engagement between the resilient tab 46 and the molding wall assists in maintaining the retainer strip 22 in any selected position within the molding during attachment to the support. Furthermore, although the strip is longitudinally slidable within the molding prior to mounting, this tab tends to yieldingly urge the retainer strip into engagement with the inwardly extending flanges 16 and 18 to aid in maintaining the bolts 32 in more readily accessible positions. To facilitate engagement of the nuts 36 with the bolts, the contour of the walls of the molding used, particularly its transverse curvature, is preferably such as to prevent excessive movement of the head portions of the strip away from the flanges. Accordingly, a proper dimensional relationship, such as that shown in the drawing, between the molding 12, the head portions 24 and the connecting portions 26 is particularly desirable to provide ease of mounting of the molding assembly on a support.

After insertion of the anchoring strips 20 and 22 within the molding, the strips are positioned with reference to the openings 39 in the supporting panel and the resultant molding assembly mounted thereon by inserting the bolts 30 through these openings. The nuts 36 are then tightened on the bolts, thereby securely and uniformly attaching the molding assembly throughout its length to the supporting panel. Of course, if the location of the openings in the supporting panel so demand, the strip 22 could be retained in the position indicated by the broken lines in Figure 4 during assembly of the molding on the panel.

Figure 6:
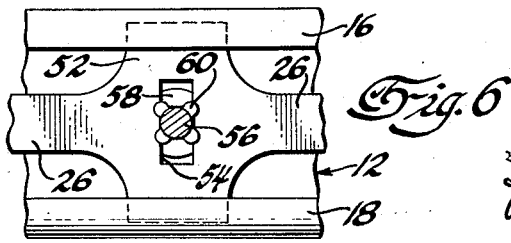
Figure 6 is an enlarged fragmentary view of a modification of the molding retainer strip shown in Figures 2 through 5, wherein additional provision is made for lateral adjustability of the molding relative to a supporting member.

The modification of the retainer strip shown in Figure 6 has each head portion 52 of the strip provided with a generally centrally located, transversely extending aperture or slot 54 of generally rectangular shape. A carriage bolt 56 has its neck portion slidably positioned within each of these slots. The square necks of these carriage bolts, engaging the side edges of the slots, prevent rotation of the bolts within the slots, while the heads 58 and the lugs 60 formed on the carriage bolts hold the bolts securely within the slot. These lugs are slightly spaced from the head portions to permit the desired sliding of the bolts transversely to the molding, thus providing the necessary lateral adjustability to compensate for misalignment of the openings 39 in the supporting panel.

It will be understood that the term "molding" as used herein is not intended as a limitation to a specific form of the invention and that the anchoring members or retainer strips are adapted generally for mounting articles of sufficient length having inwardly directed flanges or shoulders which may be engaged by the head portions of the retainer strip.

While the described embodiment of the present invention constitutes a preferred form, it is to be understood that other forms might be adapted, all coming within the scope of the following claims.

I claim:

1. A molding retaining device for mounting a hollow molding on a supporting member having a plurality of spaced apertures therein, said molding possessing longitudinal curvature and having laterally spaced inturned flanges, said device comprising a plurality of elongated metallic strips insertable within the hollow molding, each of said strips having a plurality of longitudinally spaced head portions and a relatively slender connecting portion, said head portions extending laterally beyond both side edges of said connecting portions to engage the internal surfaces of said flanges, said head portions being of decreasing lateral extension from one end of each of said strips to the other end thereof, each of said strips being independently longitudinally slidable within said molding and flexible in a direction generally normal thereto, said head portions each being provided with a bolt whose threaded portion is insertable through one of said apertures for attaching the assembled molding and retaining device to said supporting member.

2. The combination of a tapered hollow molding having inwardly extending flanges at its edges and a mounting device therefor, said mounting device comprising a pair of elongated metallic retainer strips slidably positioned within said molding, each of said strips having longitudinally spaced arm portions and a relatively narrow connecting portion which is resiliently flexible in a direction normal to the molding, said arm portions extending laterally beyond both side edges of said connecting portions and into engagement with the inner surfaces of said flanges to frictionally retain the strips therein, said arm portions being of progressively decreasing lateral extension from one end of each of said strips to the other end thereof, laterally opposite portions of said flanges being cut away to permit insertion of the retainer strips therein, each of said arm portions being provided with a generally central aperture therein, and fastening elements positioned within said apertures for engagement with openings in a supporting panel, one of said retainer strips being provided at one end with a resilient tab projecting against the inner surface of said molding to resiliently maintain the strip in any selected position within the molding and against the inner surfaces of said flanges.

3. In combination, an elongated hollow molding for mounting on a curved supporting surface, said molding possessing longitudinal curvature corresponding to the curvature of said supporting surface and having a tapered end portion narrower than an intermediate portion of said molding, said molding being provided with a pair of laterally spaced inturned flanges at its opposite side edges, and a mounting device for said molding comprising an elongated metallic retainer strip slidably positioned in said molding and having a plurality of longitudinally spaced head portions and a relatively narrow connecting portion which is resiliently flexible in a direction normal to said molding, said head portions extending laterally beyond both side edges of said connecting portion parallel with and partially overlapping both of said inturned flanges, said head portions having varying widths corresponding to the taper of said molding, oppositely disposed portions of said inturned flanges being cut away to permit insertion of the retainer strip in said molding, and fastener elements attached to said head portions for securing the assembled molding and mounting device to said supporting surface.

4. A molding assembly for mounting on a curved supporting member provided with a plurality of spaced openings, said assembly comprising an elongated hollow molding possessing longitudinal curvature corresponding to the curvature of said supporting member and having tapered end portions narrower than the intermediate portion of said molding, said molding being provided with a pair of laterally spaced inturned flanges at its opposite side edges, a pair of elongated metallic retainer strips slidably positioned in said molding, each of said strips having a plurality of longitudinally spaced head portions and a relatively narrow connecting portion which is resiliently flexible in a direction normal to said molding, said head portions extending laterally beyond both side edges of said connecting portion parallel with and partially overlapping both of said inturned flanges, said head portions engaging the inner surfaces of said flanges substantially throughout the overlapping areas to frictionally retain the strip therein, said head portions having varying widths corresponding to the taper of said molding and each being provided with an aperture extending therethrough, laterally opposite portions of said inturned flanges being cut away to permit insertion of said retainer strips in said molding, and fastener elements positioned in said apertures for engagement with said openings in said supporting member.

5. A molding assembly for mounting on a supporting member, said assembly comprising an elongated hollow molding having spaced inwardly extending flanges at its edges, one end of said molding being laterally tapered and the other end thereof having an imperforate end wall, and a mounting device for said molding comprising an elongated metallic retainer strip slidably positioned within said molding, said strip having longitudinally spaced head portions and a relatively narrow connecting portion which is resiliently flexible in a direction normal to said molding, said head portion extending laterally beyond both side edges of said connecting portion and into engagement with the inner surfaces of said flanges to frictionally retain the strip therein, said head portions being of progressively decreasing lateral extension from one end of said strip to the other end thereof, laterally opposite portions of said flanges being cut away to permit insertion of the retainer strip therein, the end of said retainer strip nearer said imperforate end wall of the molding being provided with a resilient tab projecting against the inner surface of said molding to resiliently maintain the strip in any selected position within the molding and against the inner surfaces of said flanges, and fastening elements attached to said head portions for securing the assembled molding and mounting device to said supporting member.

References Cited in the file of this patent

UNITED STATES PATENTS

| | | |
|---|---|---|
| 1,577,292 | Obreiter | Mar. 16, 1926 |
| 2,068,562 | Murphy et al. | Jan. 19, 1937 |
| 2,184,249 | Churchill | Dec. 19, 1939 |
| 2,196,417 | Kelsen | Apr. 9, 1940 |
| 2,287,606 | Eady | June 23, 1942 |
| 2,473,400 | Waara | June 14, 1949 |
| 2,515,895 | Poupitch | July 18, 1950 |
| 2,671,254 | Meyer | Mar. 9, 1954 |

FOREIGN PATENTS

| | | |
|---|---|---|
| 655,763 | Germany | 1938 |